United States Patent [19]

Oliver

[11] E Re. 30,108

[45] Reissued Oct. 9, 1979

[54] BIN PANEL CONSTRUCTION

[76] Inventor: Wayne H. Oliver, 1305 Spring Valley Rd. North, Minneapolis, Minn. 55422

[21] Appl. No.: 790,921

[22] Filed: Apr. 26, 1977

Related U.S. Patent Documents

Reissue of:

[64] Patent No.: 3,521,420
Issued: Jul. 21, 1970
Appl. No.: 830,166
Filed: Apr. 1, 1969

U.S. Applications:

[63] Continuation-in-part of Ser. No. 722,299, Apr. 18, 1968, abandoned.

[51] Int. Cl.[2] ..... E04C 2/38

[52] U.S. Cl. ..... 52/584; 52/281; 52/826; 52/192

[58] Field of Search ..... 52/192, 286, 588, 589, 52/593, 595, 281, 624, 627, 628, 482, 584, 582, 587, 630, 629

[56] References Cited

U.S. PATENT DOCUMENTS

| | | | |
|---|---|---|---|
| 1,768,742 | 7/1930 | Brogden | 2/150 |
| 2,740,613 | 4/1956 | Berliner | 52/630 |
| 3,070,168 | 12/1962 | Meek | 52/584 |
| 3,279,140 | 10/1966 | Oliver | 52/584 |
| 3,327,870 | 6/1967 | Fairchild | 52/624 |
| 3,375,631 | 4/1968 | Oliver | 52/584 |

FOREIGN PATENT DOCUMENTS

| | | | |
|---|---|---|---|
| 280186 | 10/1965 | Australia | 52/192 |

OTHER PUBLICATIONS

Sprout, Waldron & Co., Inc. of Muncy, Pa.

*Primary Examiner*—Ernest R. Purser
*Assistant Examiner*—Henry Raduazo
*Attorney, Agent, or Firm*—Merchant, Gould, Smith, Edell, Welter & Schmidt

[57] ABSTRACT

Detachable panels for use in construction of rectangular enclosures such as grain bins. The side edges of each panel are provided with mounting frames adapted to be easily secured to adjoining panels. The bottom edge of the panel is provided with a channel member to provide lateral support for the panel, and with a pair of flat connector portions that extend downwardly therefrom so that the top edge of a similar panel can be inserted between them and secured to them.

10 Claims, 9 Drawing Figures

BIN PANEL CONSTRUCTION

Matter enclosed in heavy brackets [ ] appears in the original patent but forms no part of this reissue specification; matter printed in italics indicates the additions made by reissue.

BACKGROUND OF THE INVENTION

This application is a continuation-in-part of U.S. patent application Ser. No. 722,299, filed Apr. 18, 1968, and now abandoned.

FIELD OF THE INVENTION

This invention relates generally to the construction of detachable panels for use in the construction of rectangular enclosures, and more particularly relates to improvements in supporting structure and mounting frames for such panels.

Description of the Prior Art

A prior art bin panel construction is disclosed in my previous U.S. Pat. No. 3,279,140 that issued Oct. 18, 1966. That invention provided a novel metal construction panel having secured to the edges thereof a mounting frame that was adapted to cooperate with similar mounting frames on other panels to quickly and accurately construct rectangular enclosures of varying size. The metal walls of the bin panels of this early construction were quite thin and the angle iron frames were welded to the metal panel. Some difficulty was encountered in utilizing these prior art panels since the thin sheet panels tended to flex or warp in use.

Another prior art bin panel construction is disclosed in my U.S. Pat. No. 3,375,631 that issued Apr. 2, 1968. That construction utilized a relatively thick sheet or panel to improve rigidity. Further, since the frame construction disclosed in the earlier patent did not lend itself to easy application in the case of thicker panels, a new and improved bin panel frame construction was utilized. The frame construction disclosed in my Pat. No. 3,375,631 is also much stronger than that disclosed in my previous patent since more surface area of the frame is in contact with the panel.

Although the frame construction disclosed in my Pat. No. 3,375,631 was a commercial success and has enjoyed wide acceptance in the industry, certain problems did arise where such frame construction was used. For example, referring to FIG. 5 of the patent, grain or other materials would sometimes lodge beneath the frame section and, especially if moisture were present, would sometimes not drain from the bin when it was emptied. Thus, pockets of moldy grain would sometimes remain lodged beneath the horizontally extending frame sections within the bin. Also, if the frame construction shown in my Pat. No. 3,375,631 is utilized with relatively thin panels, some flexing or warping does occur.

SUMMARY OF THE INVENTON

The present invention provides an improved frame construction for relatively thin, imperforate bin panels. The side edges of the bin panels are provided with frame members like those disclosed in my Pat. No. 3,375,631. The bottom edge of the bin panel, however, is provided with an improved frame construction. This improved frame construction includes a pair of channel members mounted or formed on opposite sides of the panel adjacent the bottom edge to provide lateral support for the panel. Extending downwardly from the bottom edge of each of the channel members is a flat connector portion. These two oppositely disposed generally parallel connector portions are designed to be placed over the free top edge of a similar panel to form a higher enclosure.

Each panel is thus provided with a bottom frame but has no frame at all on the top edge. The bottom frame not only provides lateral support for the two adjoining panels but also provides the necessary connection between them. Preferably, a similar channel member or stiffener is mounted midway between the top and bottom edge of each panel generally parallel thereto. Each channel member has a downwardly sloping, smooth upper surface so that grain or other material will not adhere thereto. In general, the channel member has a completely smooth outer surface so that material will not adhere to it when the bin is emptied.

By utilizing the present invention, relatively thin panels can be rigidly supported so that very little flexing or warping will occur. Further, the panels are quickly and easily joined together to form a tight enclosure.

DESCRIPTION OF THE PREFERRED EMBODIMENT

FIGS. 1-5

Figure 1:
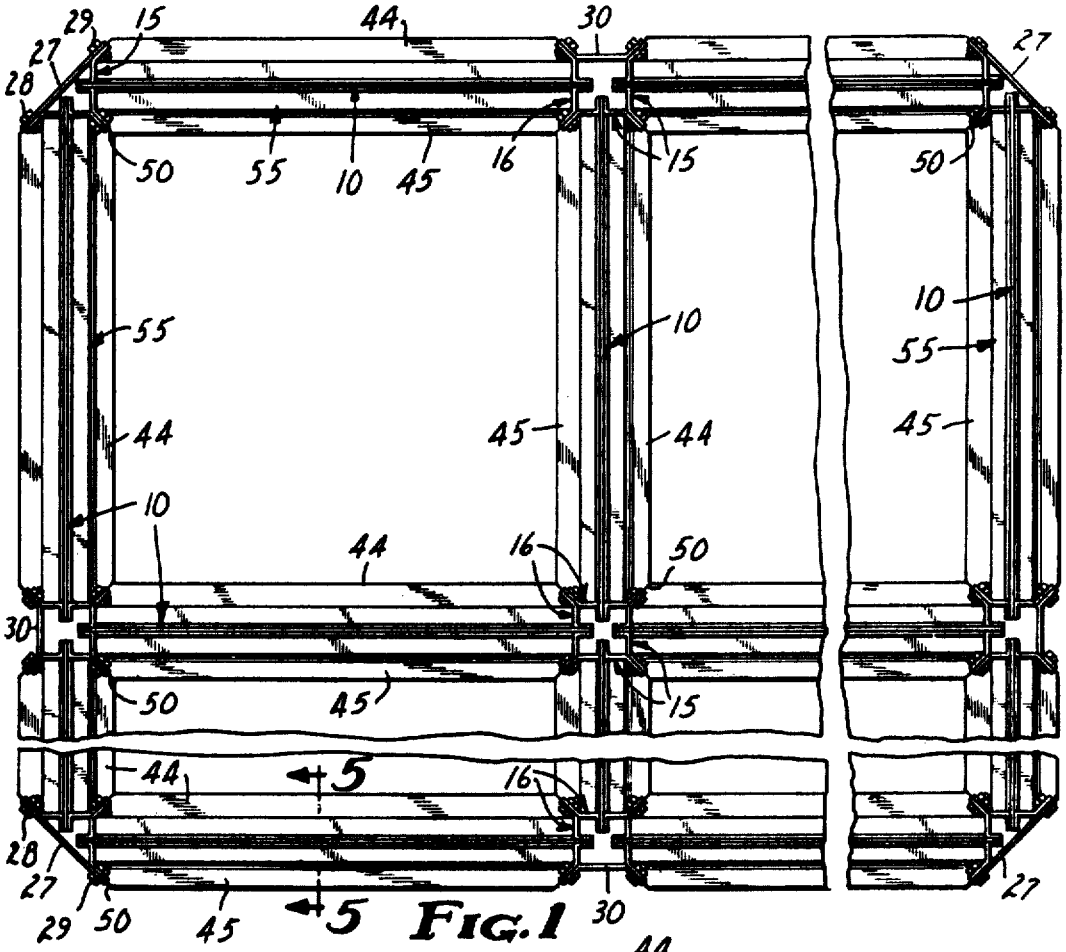
FIG. 1 is a view in top plan of a multiple bin-type construction formed in accordance with my invention, some parts thereof broken away.

Referring to the drawings, wherein like characters indicate like parts throughout the several views, one embodiment of my invention is shown in FIGS. 1-5. The numeral 10 indicates a rectangular, relatively thin, imperforate metal panel. Panel 10 has a top edge 11, a bottom edge 12, and a pair of side edges 13 and 14. Side edges 13 and 14 are provided with identical metallic frames 15 and 16. Bottom edge 12 is provided with a different form of frame 17 while top edge 11 is not provided with any frame.

Since side frame members 15 and 16 are constructed in the same manner, they can be described together.

Figure 3:
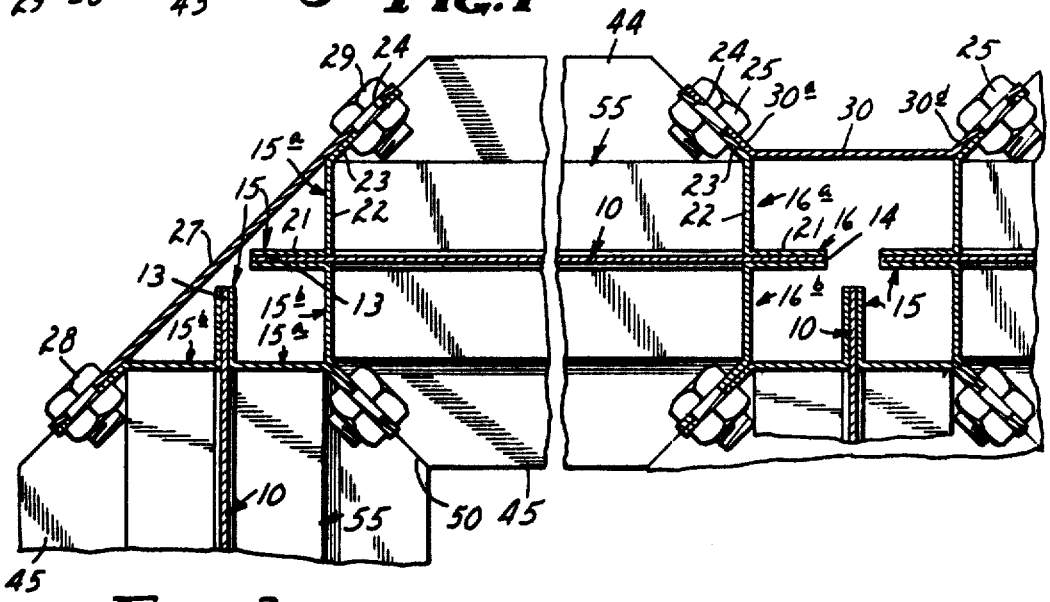
FIG. 3 is a view in horizontal section as seen from the line 3—3 of FIG. 3, on an enlarged scale, portions thereof being broken away.

Side frame members 15 and 16 each comprise a pair of identical frame sections numbered 15a, 15b, 16a and 16b. A sectional view of frame sections 15a, 15b, 16a and 16b is shown in FIG. 3. Frame sections 16a and 16b are identical and are mounted on opposite sides of panel or sheet 10 so that frame member 16 is symmetrical with respect to the plane of sheet 10. Frame sections 16a and 16b are welded to sheet 10 adjacent side edge 14. It is again noted that side frame members 15 and 16 are constructed in an identical manner.

Each of the frame sections 15a, 15b, 16a and 16b are constructed as follows. Each of the frame sections has a first flat portion 21 lying adjacent the side of sheet 10 and welded thereto. Extending from the inner edge of first flat portion 21 is a second flat portion 22 that extends outwardly from the sheet perpendicular to first portion 21. A third flat portion 23 converges inwardly from the outer edge of section portion 22 at approximately a forty-five degree angle with respect to a plane extending through second portion 22 and outwardly therefrom. Each of the third flat portions 23 is provided with a plurality of holes 24 through which bolts 25 are inserted to attach adjoining sheets or panels together.

In FIG. 1, the method of connecting the side edges of four converging panels is shown. Each sheet 10 is at right angles to the adjacent sheet. Since each of the side frame members is symmetrical with respect to the plane of the sheet, third flat portions 23 of the adjoining frame sections thereby lie closely adjacent each other so that they can be fastened together by means of bolts 25 extending through the corresponding holes 24. A plane extending between the adjoining third flat portions 23 would bisect the angle formed by adjoining sheets 10. A plurality of bolts 25 are used to secure each adjoining pair of sheets together, as shown on the drawings.

Figure 2:
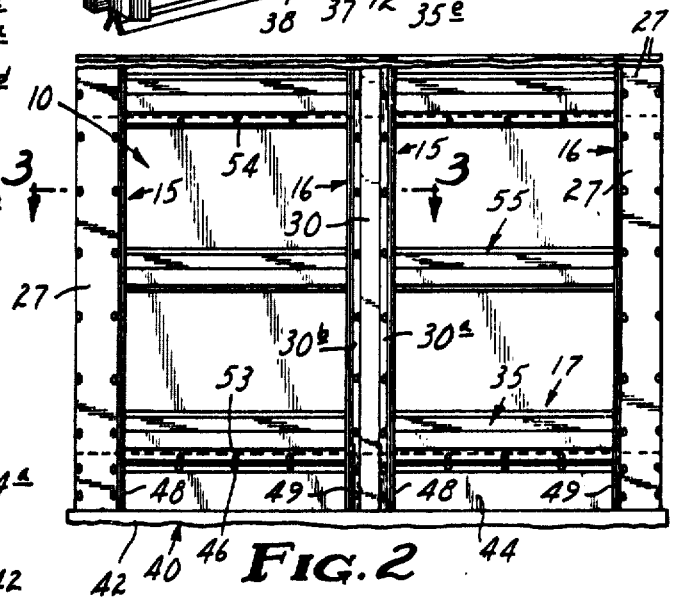
FIG. 2 is a view in side elevation of the structure of FIG. 1 some parts being broken away.

FIG. 3 discloses apparatus for connecting together the side edges of two panels at right angles to each other. The connection between the inner frame sections is the same as that previously described so need not be further described here. The pair of frame sections that extend outwardly from the enclosure, however, are connected by a flat metal strip 27 by means of a plurality of bolts such as 28 and 29. Strip 27 has a plurality of holes along each edge thereof that correspond to holes 24 in the side frame sections. A side view of supporting strips or corner strips 27 is shown in FIG. 2.

FIG. 3 also discloses apparatus for connecting together three converging sheets 10, two of which lie in the same plane and the third of which is perpendicular to the others. The sheets that are mounted at right angles with respect to each other are joined together as previously described by means of bolts 25. The two sheets 10 that are coplanar, however, do not have adjoining frame sections. To provide support for these nonadjacent frame sections a support strip 30 is utilized. The edges 30a and 30b of strip 30 are formed at approximately a forty-five degree angle with respect to the plane of sheet 10. Edges 30a and 30b can thus be aligned with the non-adjoining pair of third flat portions as shown in FIG. 3. Again, strip 30 is bolted to the third flat portions 23 as previously described.

Figure 5:
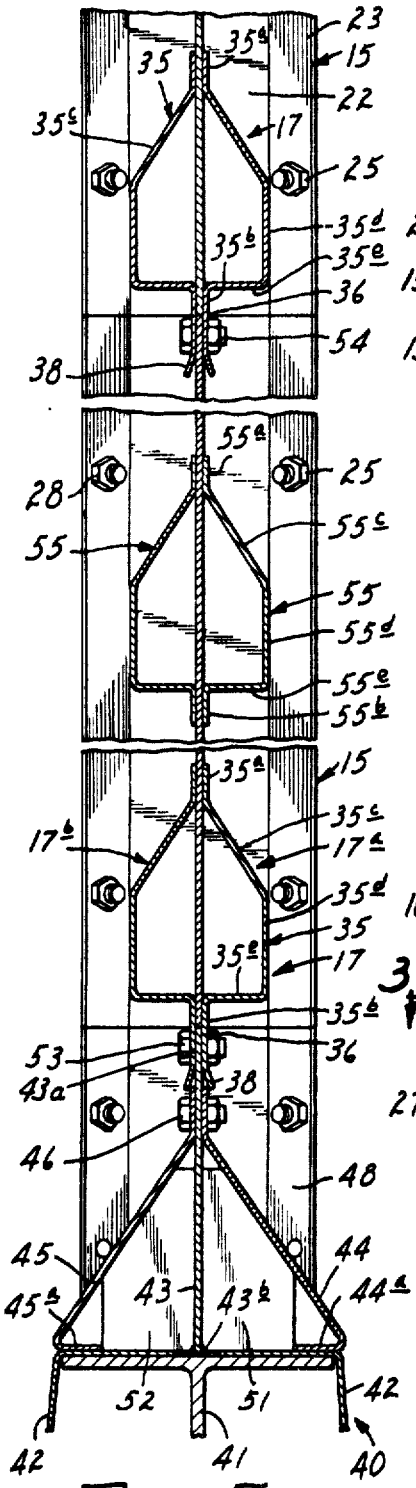
FIG. 5 is a view in vertical section as seen from line 5—5 of FIG. 1, on an enlarged scale, portions thereof being broken away.
Figure 4:
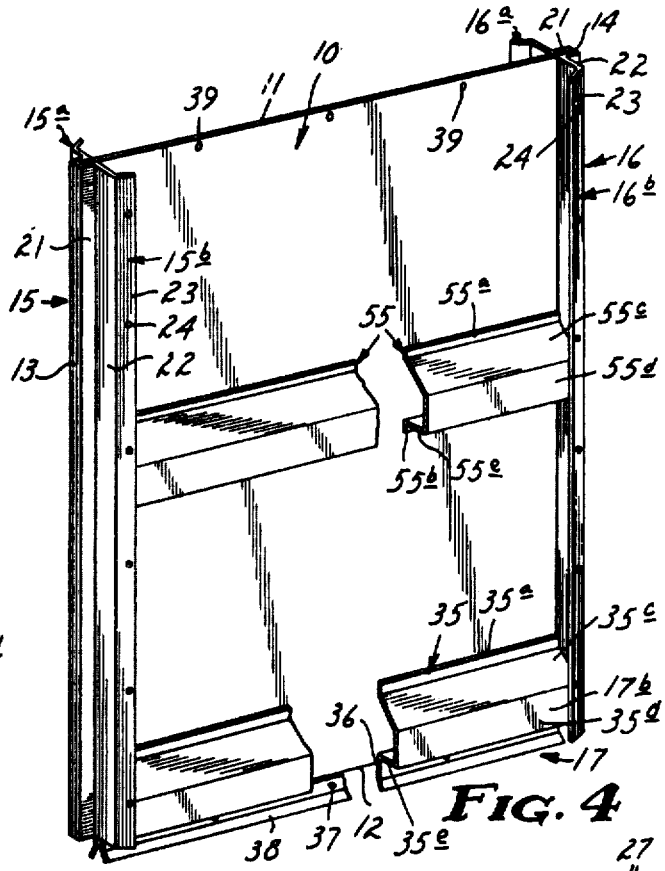
FIG. 4 is an enlarged perspective view of one of the bin panels utilized in formation of the structure in FIG. 1, some parts being broken away, and some parts being shown in section.

Sheets 10 can also be mounted in an overlying relationship as shown in FIG. 5 to increase the height of the enclosures formed by the panels. The attachment of the overlying sheets 10 is made by means of bottom frame member 17. Bottom frame member 17 comprises identical frame sections 17a and 17b mounted on opposite sides of sheet 10 so that frame member 17 is symmetrical with respect to the plane of sheet 10. In this embodiment of my invention, frame sections 17a and 17b are welded to the opposite sides of sheet 10.

Both of the frame sections 17a and 17b are constructed as follows. Each frame section has an upper channel member portion 35 and a lower connector portion 36. Upper channel member portion 35 has a first and second flat coplanar portion 35a and 35b attached to the side of the sheet and separated from the sheet by a convex middle portion. The convex middle portion has a downwardly sloping upper surface 35c extending from first portion 35a, a vertical portion 35d extending downwardly from the bottom edge of surface 35c, and a lower surface portion 35e that extends outwardly from second portion 35b at right angles thereto and connects with the bottom edge of vertical portion 35d.

Lower connector portion 36 is a downward extension of second flat portion 35b and extends beyond bottom edge 12 parallel to the side of sheet 10. Actually, the inner surfaces of first flat portion 35a, second flat portion 35b and connector portion 36 all lie in the same plane as the surface of sheet 10 to which they are attached. A plurality of holes 37 are formed in each of the connector portions 36 below bottom edge 12.

Extending downwardly and outwardly from the bottom edge of each connector portion 36 is a flat guide portion 38. Guide portions 38 form an acute angle with the plane of sheet 10. The top edge of each sheet 10 is provided with a plurality of holes 39, equal in number and in spacing to the holes 37 in connector portion 36.

Before the panels of the present invention are assembled into an enclosure, a suitable foundation must first be provided. In this embodiment, the enclosure is mounted on a base of foundation 40 which actually is the upper edge of a grain hopper. The upper edge of base 40 is formed by a standard member or beam 41 which extends around its periphery. A metal cap 42 placed over beam 41 extends downwardly to provide a smooth surface for the hopper structure. Extending vertically upwardly from the center of support structure or beam 41 is a rectangular metal starter sheet or strip 43. Sheet 43 has the same thickness as sheets 10 and also has the same width. Sheets 43 are much shorter than sheets 10, however, since they are merely starter strips for the enclosure. A pair of ramp members 44 and 45 are also provided, one on each side of sheet 43. Ramp members 44 and 45 are bolted at their top edges to sheet 43 by means of bolts 46. The top edge 43a of sheet 43 extends upwardly a short distance from the top edges of ramp members 44 and 45 to provide support for the bottom edge of sheet 10. Ramp members 44 and 45 flare downwardly and outwardly from their point of connection to sheet 43 and are curved inwardly at their bottom edges as at 44a and 45a for contact with the upper surface of cap 42. Ramp members 44 and 45 thus form a generally triangular enclosure having a base equal in width to the width of cap 42.

As previously mentioned, structural member 41 is a structural beam forming the entrance to a hopper, and cap 42 extends downwardly to form the hopper discharge opening. Sheet 43 forms a starter strip for the enclosure formed by the panels 10. To begin building the enclosure, a series of starter strips 43 are mounted around the supporting structure to form the basic outline for the enclosure. The bottom edge of sheet 43 is welded to the support structure as at 43b. Welded to the opposite ends of each starter strip 43 are a pair of vertical frame members 48 and 49, identical in construction to vertical frame members 15 and 16. The vertical edges of adjoining starter strips 43 are thus joined together in exactly the same fashion as the vertical edges of panels 10, therefore such connections needs not be described in detail again. The opposite ends of ramp members 44 and 45 are cut so as to have the same configuration as the inner surfaces of vertical frame members 48 and 49. Since the opposite ends of ramp members 44 and 45 fit tightly against the inner surface of vertical frame members 48 and 49, no grain can fall between them. To the extent that ramp members 44 and 45 are wider than frame members 48 and 49, the ends are mitered as shown at 50 in FIG. 3 to prevent the entry of material therebetween. To provide further support for ramp members 44 and 45 a plurality of metal gussets such as 51 and 52 are mounted between ramp member 44 and starter strip 43 and between ramp member 45 and starter strip 43. Gussets 51 and 52 are mounted at right angles to starter strip 43 and are welded thereto.

After the starter strips 43 have all been placed in position around the periphery of the foundation, they are bolted together by means of corner strips and support strips in the manner previously described for the panels 10. The one side of the enclosure shown in FIG. 2 thus utilizes a pair of corner strips 27 to connect together the adjoining vertical frame members 48, and a support strip 30 to join together the vertical frame members 48 and 49 that adjoin each other. A plurality of ramp members 44 and 45 are bolted to starter strips 43 as heretofore described so that a rigid starter enclosure is formed having an upstanding, free edge 43a around the entire periphery of the enclosure.

A panel 10 is then inserted over each of the starter strips 43 with the oppositely disposed connector portions 36 positioned on opposite sides of the top edge 43a. The top edge 43a of the starter strip thus lies in contact with the bottom edge 12 of the panel 10, as best shown in FIG. 5. The oppositely flaring guide portions 38 make it easier to insert edge 43a between connector portions 36. Any slight imperfections in the top edge 43a will be accommodated by the oppositely flaring guide portions 38. Top edge 43a is provided with a plurality of holes that correspond in position to the holes 37 in connector portions 36. A plurality of bolts 53 are inserted through these corresponding holes to securely attach the panels together.

As shown in FIG. 5, additional panels 10 can be mounted above the first mounted panel 10 in the same fashion. In this case, the free top edge 11 of the bottom panel 10 is inserted between the connector portions 36 of the upper panel 10 with the holes 39 aligned with the holes 37. A plurality of bolts 54 are inserted through these aligned holes to secure the upper and lower panels 10 together.

In this type of construction, the channel member portion 35 of each frame section 17a and 17b acts to provide lateral support for sheet 10 to prevent flexing thereof. The channel member portions 35 provide support for both the upper and lower panel 10 since they are located closely adjacent the connection between the two panels.

Because rather thin metal panels 10 are being used, each sheet 10 is provided with an additional channel member 55 attached to each side of the sheet generally midway between the top and bottom edges and generally parallel thereto. Each channel member 55 has the same configuration as the channel member portions 35 of horizontal frame members 17 previously described. Each channel member 55 thus has upper and lower flat coplanar portions 55a and 55b that are welded to the side of sheet 10. Portions 55a and 55b are connected by a convex portion 55c, 55d and 55e spaced from the side of sheet 10. Since the configuration is the same as that previously described for channel member portions 35, the description will not be repeated here. Again, the purpose of channel member 55 is to lend further rigidity to sheet 10 so that it will not flex outwardly when the enclosure is filled with a material such as grain.

Because of these various constructional features, each sheet 10 forms a very rigid rectangular panel. The panel cannot flex about any horizontal axis since the side frame members 15 and 16 provide rigidity in a vertical direction. The panels cannot flex about in a vertical axis since the channel members 35 and 55 are rigid in a horizontal direction. The resulting rectangular enclosure is thus extremely rigid and strong despite the relative thinness of each sheet 10.

The configuration of the horizontal channel members also makes it difficult for grain or other material to adhere to them when the enclosure is emptied. The upper sloping surface of the channel members insures that loose material will fall off them by gravity. The clean configuration of the under surface of the channel members does not provide any pockets or protuberances that would tend to cause material to adhere to them. These features make the present structure much superior over prior art structures which often have had ledges or other pockets formed by the connecting structure into which grain or other material lodged when the enclosure was emptied.

FIGS. 6–9

An alternate form of my invention is shown in FIGS. 6–9. The difference lies in the specific form of side frames used, the different manner in which some of the channel members are formed and some differences in the top and bottom areas of the panel. These panels are secured together in generally the same manner as the panels previously described so that no further description of the overall enclosures is required. However, it will be necessary to described the specific features of this alternate embodiment.

Figure 9:
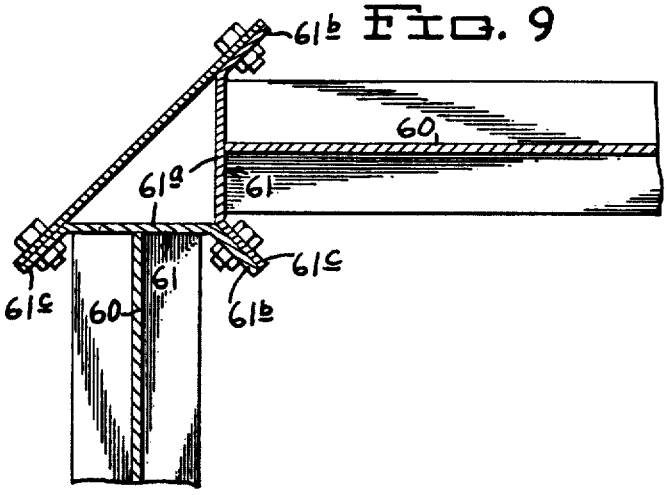
FIG. 9 is a view similar to that shown in FIG. 3, showing a corner connection between two panels of the type shown in FIG. 6.

The bin panel includes a generally rectangular metal sheet 60 having side frame members 61 and 62 welded to the side edges thereof. The side frame members 61 and 62 are symmetrical with respect to the plane of the sheet 60 and include a flat central portion designated by the letter a and a pair of outer portions designated by the letters b and c. The outer portions converge inwardly from the outer edges of the central portion at a predetermined angle, normally forty-five degrees, with respect to the central portion. The overall shape of the side frame members 61 and 62 is thus the same as the other embodiment of my invention, and as shown in FIG. 9, these side frame members are connected together in the same manner to form similar enclosures.

Figure 7:
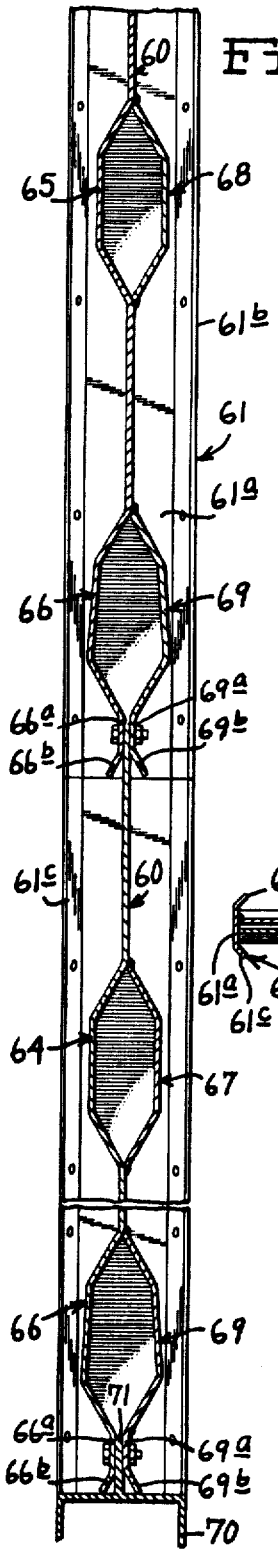
FIG. 7 is a view in vertical section, similar to the view shown in FIG. 5, showing use of the bin panel embodiment of FIG. 6.
Figure 6:
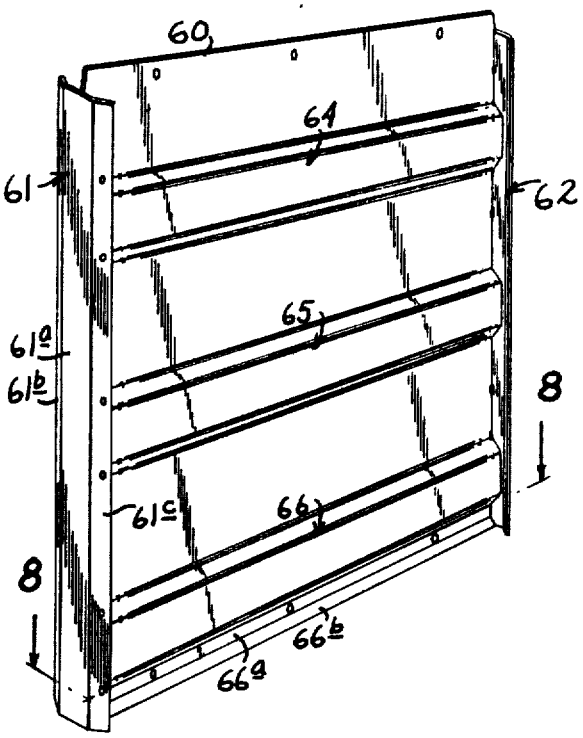
FIG. 6 is an enlarged perspective view of another bin panel embodiment that can be used in forming a structure similar to that shown in FIG. 1.

As shown in FIGS. 6 and 7, sheet 60 has three channel member portions 64, 65 and 66 formed integrally therewith. Separate channel member portions 67, 68 and 69 are welded to the other side of the sheet. Therefore, as shown in FIG. 6, one side of the bin panel is completely smooth as there are no seams between the sheet and the channel members. This smooth side of the bin panel is normally faced outwardly to provide a smooth drain surface for rain and other moisture. This feature largely eliminates rusting, streaking and other discoloration problems.

In this embodiment, the two channel member portions 66 and 69 form the major portion of a bottom frame member that both lends rigidity to the sheet and provides a means of connecting it to the top edge of another bin panel. Extending downwardly from channel member portions 66 and 69 are a pair of connector portions 66a and 69a. These two connector portions are generally parallel and are spaced apart a distance generally equal to the thickness of a sheet 60. A pair of flat guide portions 66b and 69b extend downwardly and outwardly from the associated connector portions as previously described with respect to the other embodiment of my invention.

In this embodiment of my invention, side frames 61 and 62 terminate in line with the bottom edge of guide portions 66b and 69b. The top edge of sheet 60 extends upwardly beyond the top ends of side frames 61 and 62. Therefore, when one bin panel of this type is mounted on top of another identical panel, the top edge of sheet 60 will extend upwardly between the connector portions 66a and 69a of the upper panel, and also between the bottom ends of the side frames of the upper panel. Suitable holes are provided in the sheet adjacent its top edge and in the connector portions for bolting them together as shown in FIG. 7.

To permit easier insertion of the top edge of the sheet between the connector portions of the upper panel, the corner portions of the sheet at the opposite ends of the top edge are removed, as shown in FIG. 6. By removing or bevelling the corners, the length of the top edge of sheet 60 is reduced so that it does not bind between the side frames of the upper panel. This beveled corner feature also tends to guide or lead the upper panel into the correct position over the lower panel. It is also self-centering because it forces the top panel to adjust itself laterally until its side frames are directly above the side frames of the lower panel.

Figure 8:
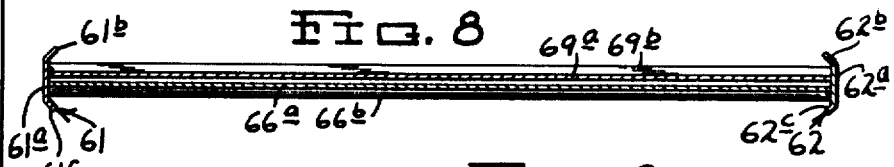
FIG. 8 is a view in horizontal section as seen from the line 8—8 of FIG. 6, on an enlarged scale.

As shown in FIG. 8, connector portion 66a is spot-welded to side frame 62, while connector portion 69a is spot-welded to side frame 61. This permits a slight amount of movement between the two connector portions 66a and 69a to facilitate insertion of the top edge of another sheet and to later permit them to be clamped tightly against the sheet.

In FIG. 7, a support or foundation 70 is shown having a simple vertical starter sheet 71 extending upwardly therefrom. I intend, of course, that the starter assembly shown in FIG. 5 could be used as well.

It is evident from my disclosure that a wide variety of enclosures can be constructed utilizing my invention. The bin panels of my invention can be attached together in a wide variety of ways so that bins of various sizes can be built. Such enclosures can be built quickly and accurately with a minimum of labor and instruction. Further, because each panel has a fixed construction, it is impossible to construct an enclosure that is not aligned properly.

What is claimed is:

1. A bin panel comprising:

(a) a generally rectangular, imperforate sheet having first and second sides and having a top edge, a bottom edge, and a pair of side edges connecting said top and bottom edges;

(b) a side frame attached to each of said pair of side edges of said sheet for connecting said bin panel to the side edges of other bin panels;

(c) a bottom frame member comprising a pair of bottom sections on said first and second sides of the plane of said sheet, said bottom sections having a channel member portion to lend rigidity to said sheet and a connector portion extending downwardly therefrom;

(d) means for spacing said connector portions a distance apart generally equal to the thickness of said sheet; and (e) one of said bottom sections being integrally formed with said sheet, and the other connected thereto.

2. A bin panel comprising:

(a) a generally rectangular, imperforate sheet having first and second sides and having a top edge, a bottom edge, and a pair of side edges connecting said top and bottom edges;

(b) a side frame attached to each of said pair of side edges of said sheet for connecting said bin panel to the side edges of other bin panels;

(c) a bottom frame member comprising a pair of bottom sections on said first and second sides of the plane of said sheet, at least one of said bottom sections having a channel member portion to lend rigidity to said sheet and both having a connector portion extending downwardly therefrom;

(d) means for spacing said connector portions a distance apart generally equal to the thickness of said sheet; and (e) each of said side frames being formed from a single sheet of material and being symmetrical with respect to the plane of said sheet and including a flat central portion secured to said side edge with a pair of outer portions converging inwardly from the outer edges of said central portion at a predetermined angle with respect to said central portion.

3. The apparatus of claim 2 including a flat guide portion extending outwardly from the lower edge of each of said connector portions and forming an acute angle with respect to a plane extending therethrough.

4. A bin panel comprising:

(a) a generally rectangular, imperforate sheet having first and second sides and having a first end edge, a second oppositely disposed end edge, and a pair of side edges connecting said first and second end edges;

(b) a side frame, having first and second ends, attached to each of said pair of side edges of said sheet for connecting said bin panel to the side edges of other bin panels;

(c) end frame means comprising connector means on said first and second sides of the plane of said sheet, extending a predetermined distance beyond said second end edge, said connector means each having a flat guide portion extending outwardly from the lower edge thereof and forming an acute angle with respect to a plane extending therethrough;

(d) means for spacing said connector means a distance apart generally equal to the thickness of said sheet; and (e) said first edge extending beyond said first ends of said side frames and said connector means terminating in line with the second ends of said side frames.

5. A bin panel comprising:

(a) a generally rectangular, imperforate sheet having first and second sides and having a first end edge, a second oppositely disposed end edge, and a pair of side edges connecting said first and second end edges;

(b) a side frame, having first and second ends, attached to each of said pair of side edges of said sheet for connecting said bin panel to the side edges of other bin panels;

(c) frame means on said second end edge comprising a pair of sections on said first and second sides of the plane of said sheet, at least one of said sections having a channel member portion to lend rigidity to said sheet and both having a connector portion extending therefrom beyond said second end edge;

(d) said connector portions having a flat guide portion extending outwardly from the lower edge thereof and forming an acute angle with respect to a plane extending therethrough;

(e) means for spacing said two connector portions a distance apart generally equal to the thickness of said sheet; and (f) said first end edge extending beyond said first ends of said side frames and said frame means terminating in line with the second ends of said side frames.

6. A bin panel comprising:

(a) a generally rectangular, imperforate sheet having first and second sides and having a first end edge, a second oppositely disposed end edge, and a pair of side edges connecting said first and second end edges;

(b) a side frame formed from a single sheet of material attached to each of said pair of side edges of said sheet for connecting said bin panel to the side edges of other bin panels, said side frames each having a relatively wide, flat central portion secured to said side edge with a pair of outer portions converging inwardly from the outer edges of said central portion at a predetermined angle with respect to said central portion;

(c) frame means on said second end edge comprising a pair of sections on said first and second sides of the plane of said sheet, at least one of said sections having a channel member portion to lend rigidity to said sheet and both having a connector portion extending therefrom beyond said end edge;

(d) said connector portions each having a flat guide portion extending outwardly from the lower edge thereof and forming an acute angle with respect to a plane extending therethrough; and (e) means for spacing said connector portions a distance apart generally equal to the thickness of said sheet.

7. A bin panel comprising:

(a) a generally rectangular, imperforate sheet having first and second sides and having a top edge, a bottom edge, and a pair of side edges connecting said top and bottom edges;

(b) a side frame attached to each of said pair of side edges of said sheet for connecting said bin panel to the side edges of other bin panels;

(c) a bottom frame member comprising a pair of bottom sections on said first and second sides of the plane of said sheet, at least one of said bottom sections having a channel member portion to lend rigidity to said sheet and both having a connector portion extending downwardly therefrom;

(d) means for spacing said connector portions a distance apart generally equal to the thickness of said sheet; [and]

(e) the bottom ends of said side frames terminating in line with the bottom of said bottom frame member, and the top edge of said sheet extending upwardly beyond the top ends of said side frames; *and*

*(f) the corner portions of said sheet at the opposite ends of said top edge being removed to reduce the length of said top edge for easier insertion between the connector portions of another bin panel.*

[8. The apparatus of claim 7 wherein the corner portions of said sheet at the opposite ends of said top edge are removed to reduce the length of said top edge for easier insertion between the connector portions of another bin panel.]

9. A bin panel comprising:

(a) a generally rectangular, imperforate sheet having first and second sides and having a top edge, a bottom edge, and a pair of side edges connecting said top and bottom edges;

(b) a side frame attached to each of said pair of side edges of said sheet for connecting said bin panel to the side edges of other bin panels;

(c) a bottom frame comprising a pair of bottom sections on said first and second sides of the plane of said sheet, at least one of said bottom sections having a channel member portion to lend rigidity to said sheet and both having a connector portion extending downwardly therefrom;

(d) means for spacing said connector portions a distance apart generally equal to the thickness of said sheet; [and]

(e) said bottom frame member extending beyond the bottom ends of said side frames and the top edge of said sheet terminating in line with the top ends of said side frames; *and*

*(f) said connector portions each having an outwardly flaring guide portion extending from the lower edge thereof.*

10. A bin panel comprising:

(a) a generally rectangular, imperforate sheet having first and second sides and having a first end edge, a second oppositely disposed end edge, and a pair of side edges connecting said first and second end edges;

(b) a side frame, having first and second ends, attached to each of said pair of side edges of said sheet for connecting said bin panel to the side edges of other bin panels;

(c) frame means on said second end edge comprising a pair of sections on said first and second sides of the plane of said sheet, at least one of said sections having a channel member portion to lend rigidity to said sheet and both having a connector portion extending therefrom beyond said second end edge spaced a distance apart generally equal to the thickness of said sheet;

(d) said connector portions each having an outwardly flaring guide portion extending from the lower edge thereof; and (e) said frame means extending beyond said second ends of said side frames and said first end edge terminating in line with the first ends of said side frames.

[11. A bin panel comprising:

(a) a generally rectangular, imperforate sheet having first and second sides and having a first end edge, a second oppositely disposed end edge, and a pair of side edges connecting said first and second end edges;

(b) a side frame formed from a single sheet of material attached to each of said pair of side edges of said sheet for connecting said bin panel to the side edges of other bin panels, said side frames each having a relatively wide, flat central portion secured to said side edge with a pair of outer portions converging inwardly from the outer edges of said central portion at a predetermined angle with respect to said central portion;

(c) frame means on said second end edge comprising a pair of sections on said first and second sides of the plane of said sheet, at least one of said sections having a channel member portion to lend rigidity to said sheet and both having a connector portion extending therefrom beyond said end edge; and (d) means for spacing said connector portions a distance apart generally equal to the thickness of said sheet.]

*12. A bin panel comprising:*

*(a) a generally rectangular, imperforate sheet having first and second sides and having a top end edge, a bottom end edge, and a pair of side edges connecting said top and bottom end edges;*

*(b) a side frame attached to each of said pair of side edges of said sheet for connecting said bin panel to the side edges of other bin panels;*

*(c) a bottom frame member at said bottom end edge comprising a pair of bottom sections on said first and second sides of the plane of said sheet, at least one of said bottom sections having a channel member portion to lend rigidity to said sheet and both having a connector portion extending downwardly therefrom;*

*(d) means for spacing said connector portions a distance apart generally equal to the thickness of said sheet;*

*(e) one of said bottom end edge and said top end edge protruding beyond the ends of said side frames, and the other thereof terminating in line with the opposite ends of said side frames; and*

*(f) the corner portions of said sheet at the opposite ends of said protruding end edge being removed to reduce the length of said edge for easier connection with another bin panel.*

* * * * *